United States Patent
Martin et al.

[19]

[11] Patent Number: 6,092,966
[45] Date of Patent: Jul. 25, 2000

[54] MULTI-PURPOSE DUMP UNIT FOR VEHICLES

[75] Inventors: Charles Martin, Libson; Michael Dean, Marion, both of Iowa; Peter Cervelli, Plainview, N.Y.

[73] Assignee: Highway Equipment Company, Cedar Rapids, Iowa

[21] Appl. No.: 09/120,224

[22] Filed: Jul. 22, 1998

[51] Int. Cl.[7] .................................................. A01C 19/00
[52] U.S. Cl. ............................ 410/22 P; 298/1 A; 298/7; 298/22 R; 298/26; 414/519; 414/528; 414/502; 239/657; 239/672; 239/676
[58] Field of Search .................................... 298/1 A, 1 B, 298/7, 22 R, 22 P, 26; 414/519, 528, 502; 239/657, 672, 676

[56] References Cited

U.S. PATENT DOCUMENTS

| | | | |
|---|---|---|---|
| 3,790,090 | 2/1974 | Lorenc et al. | 239/676 X |
| 4,266,731 | 5/1981 | Musso, Jr. . | |
| 4,886,214 | 12/1989 | Musso, Jr. et al. . | |
| 5,310,119 | 5/1994 | Musso, Jr. et al. . | |
| 5,397,172 | 3/1995 | Musso, Jr. et al. | 298/22 R |
| 5,400,974 | 3/1995 | Musso, Jr. et al. . | |
| 5,437,499 | 8/1995 | Musso | 298/26 |
| 5,466,112 | 11/1995 | Feller | 414/528 |
| 5,618,002 | 4/1997 | Cervelli et al. . | |
| 5,772,387 | 6/1998 | Feller | 414/528 X |

FOREIGN PATENT DOCUMENTS 793042 1/1936 France .................................. 239/657

OTHER PUBLICATIONS

Flo 'N Dump Publication, 2 pages, no date.
Parker Pick–Up Truck Refuse Dumpers Publication, 2 pages, no date.
Air–Flo Multi–Purpose Dump Bodies, Models CD–8/CD–10 Publication, 2 pages May 1997.
Parker Industries Publication, 2 pages, no date.
Air–Flo 'N Dump 10 Gauge Corten Steel Body Publication, 1 page, no date.
Air–Flo Heavy Duty Dump Bodies, Model DBT Publication, 1 page, no date.

*Primary Examiner*—Stephen T. Gordon
*Attorney, Agent, or Firm*—James C. Nemmers

[57] ABSTRACT

A multiple purpose dump unit designed to be mounted on a vehicle for hauling, dumping, spreading and the collection of refuse as well as for distributing salt, sand and other aggregates. The unit has a single dump body with a sloping, fixed endgate and a longitudinally extending conveyor along the open bottom of the dump body, and the unit is provided with a spreader mechanism at the exit gate from the conveyor to facilitate spreading of salt, sand and other aggregates. The unit is pivotally mounted near its rear end so that it can be lifted by hydraulic cylinders for dumping, spreading aggregate, asphalt, etc. The dump unit can be sized so that the vehicle can navigate narrow streets and alleys and is mounted at a height and with sides of a height to meet the requirements for manual refuse loading.

7 Claims, 3 Drawing Sheets

MULTI-PURPOSE DUMP UNIT FOR VEHICLES

BACKGROUND OF THE INVENTION

This invention relates to a dump unit for a vehicle that can be used for a variety of purposes. Trucks having an open tiltable, dump body are known and currently used for hauling various materials, and with the aid of a conveyor integrated into the floor of the dump body, the material can be dumped, spread or distributed by a spreading mechanism mounted at the discharge end of the conveyor. Trucks with this type of multi-purpose dump body can therefore be used for hauling and dumping almost any material, including sand, aggregate, fill material, etc. used in construction of roads, for example. In one mode, the dump body is titlted upwardly about its rear end to discharge the material through a pivotally mounted rear endgate that is open. If the truck is moved forwardly with the dump body tilted and the tailgate open, material can be spread over an area. In another mode with the dump body lowered and the conveyor and spreading mechanism operating, the truck can be used to spread and distribute salt-sand or similar mixtures to control ice on a roadway. Trucks having a multi-purpose dump body are also very useful to governmental units which provide multiple services to the general public. These trucks can be used not only for general hauling, road repair and maintenance, snow removal and ice control, but could also be used to assist in refuse collection, although currently they are not used for this purpose.

Although in some cases the services of refuse collection are contracted to private contractors, many cities and towns provide these services directly. At the present time, refuse is typically collected in a specially designed collection vehicle that has an open dump area at the rear where the collectors manually pick up the refuse at curbside and dump it into the vehicle. Because refuse is picked up and dumped into the collection vehicle manually, it is common to impose standards as to the height of the opening at the rear of the collection vehicle so that the collectors do not have to lift the refuse containers too high to empty them in the collection vehicle. Once the refuse is manually deposited in the opening at the rear of the collection vehicle, a hydraulically powered mechanism is operated to move the refuse from the opening into a storage area within an enclosed part of the collection vehicle. When the storage area of the collection vehicle is filled, the refuse is transported to a dump site where the refuse is deposited and the collection vehicle then returned to its collection route. In order to make refuse collection more efficient, these collection vehicles are typically rather large so as to minimize the number of trips that must be made to the dump site. The large size of the collection vehicle may present a problem in some of the inner city routes in of the older metropolitan areas due to the fact that the refuse collection route is commonly through a number of narrow streets and alleys. In many instances, the standard, large collection vehicle simply is too large to navigate these narrow spaces. Therefore, it has become necessary to provide a smaller refuse collection vehicle that can navigate the narrow streets and alleys. The most common such vehicle is an open-bed dump truck which has low sides and is mounted relatively low to the ground to facilitate the manual lifting and dumping of refuse into the open bed. These smaller collection vehicles are commonly downsized dump trucks that have a rear endgate pivotally mounted at its upper edge and which will swing open at the bottom when the dump bed is raised to an angle of approximately 45°. There is also known a dump unit that can be mounted on the bed of a pick-up truck. This unit is an open dump body with a fixed endgate. Such units are typically single purpose vehicles used only for refuse collection.

Users of vehicles of this type obviously are cost conscious and prefer to utilize their vehicles to the maximum extent possible. Governmental units especially have limited budgets and also have the responsibility of maintaining the roadways within their corporate limits. For this purpose, dump trucks are also provided with a blade on the front for snow removal and a spreading mechanism at the rear of the vehicle to spread salt and sand over the roadways. In an effort to minimize costs, there are commercially available vehicles in which the refuse collection bed can be removed from the chassis of the vehicle and replaced with a open dump bed that has a spreading mechanism and conveyor for use in spreading salt or sand or a mixture of salt and sand. However, changing over from a refuse collection bed to a spreader bed is a time consuming and somewhat difficult process, particularly during winter months when frequent snowfalls can interfere with regular refuse collection schedules. Substantial economies could be realized if a multi-purpose vehicle were available which could be used for general hauling, refuse collection, salt and sand spreading, and also be used to spread aggregates, asphalt, etc. in the construction of roads and parking areas. Such a vehicle could also be used for fertilizer spreading. Such a multi-purpose vehicle must be small enough to navigate narrow streets and alleys, be of a size to meet the requirements for manual refuse loading and also be capable of dumping refuse into the larger refuse collection vehicles. It is a primary object of the invention to provide such a vehicle which can be used for all of these purposes without requiring any labor or time in making a changeover from one function to another.

SUMMARY OF THE INVENTION

The invention provides for a multiple purpose dump unit mounted on a vehicle truck chassis that is designed for general hauling, dumping and spreading, refuse collection, and the distribution of salt, sand and other similar materials. The dump unit has a single dump body with a sloping, fixed rear endgate and a longitudinally extending conveyor along the open bottom of the dump body. The dump unit is pivotally mounted near its rear end so that it can be lifted by hydraulic cylinders for dumping, spreading aggregate, asphalt, etc. The dump unit is provided with a spreader mechanism at the exit gate from the conveyor to facilitate spreading of salt, sand and other aggregates. The dump unit can be sized so that the vehicle can navigate narrow streets and alleys and is mounted at a height and with sides of a height to meet the requirements for manual refuse loading. The hydraulic hoists are designed to lift the dump unit to an angle sufficiently high to dump materials over the fixed endgate. When the dump unit is in an elevated position, the fixed endgate is sufficiently high to dump refuse into a typical collection vehicle that has an open dump area at the rear. When in the elevated position for dumping, the conveyor can be operated to aid in clean out of material from the dump body.

DESCRIPTION OF THE PREFERRED
EMBODIMENT OF THE INVENTION

Figure 1:
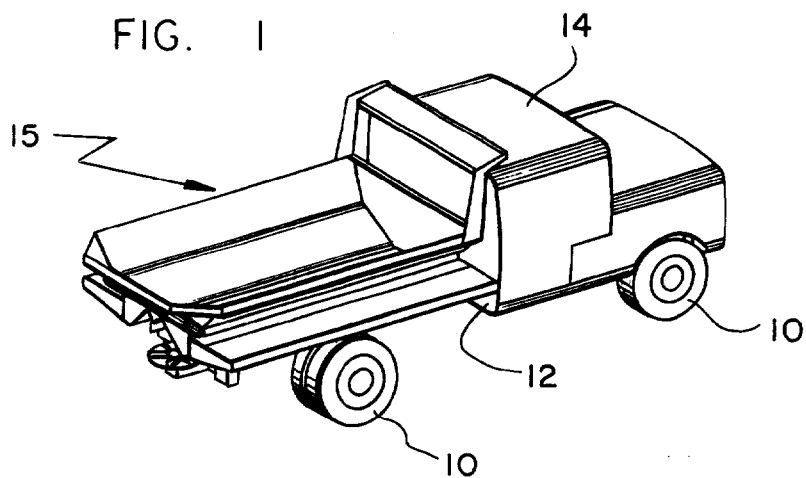
FIG. 1 is a perspective view of a multi-purpose vehicle that incorporates the principles of the invention.
Figure 2:
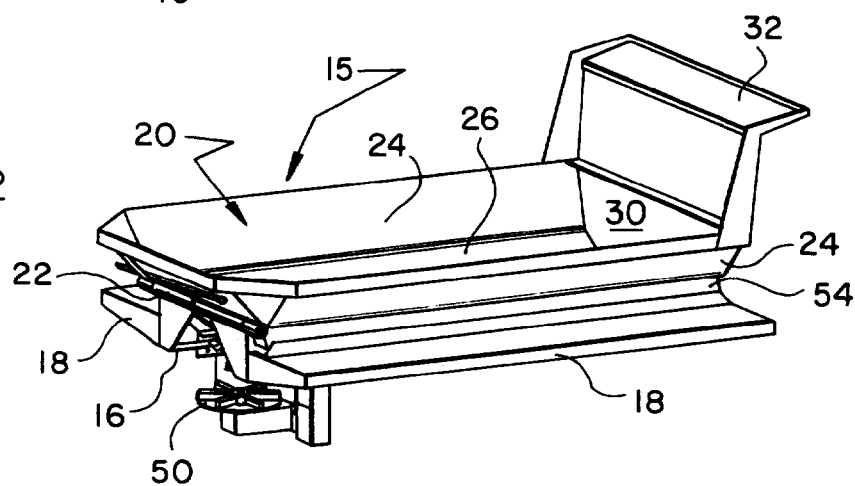
FIG. 2 is a perspective view of the dump unit viewing it from the upper right rear.
Figure 3:
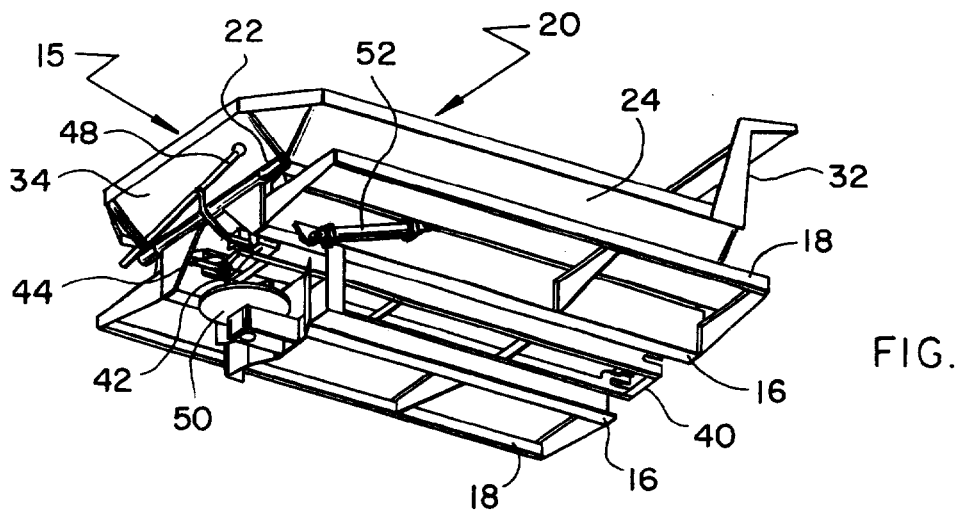
FIG. 3 is a perspective view of the vehicle dump unit viewing it from the lower right rear.
Figure 4:
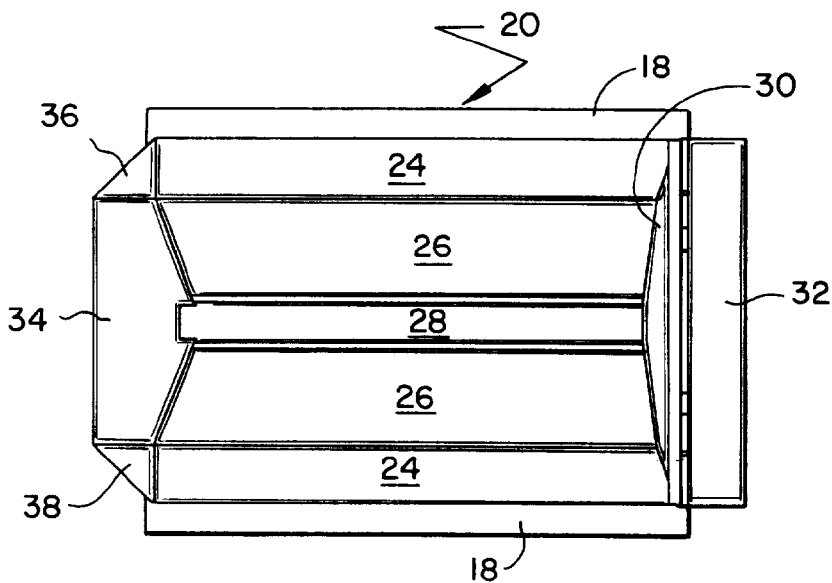
FIG. 4 is a top view of the vehicle dump unit.
Figure 5:
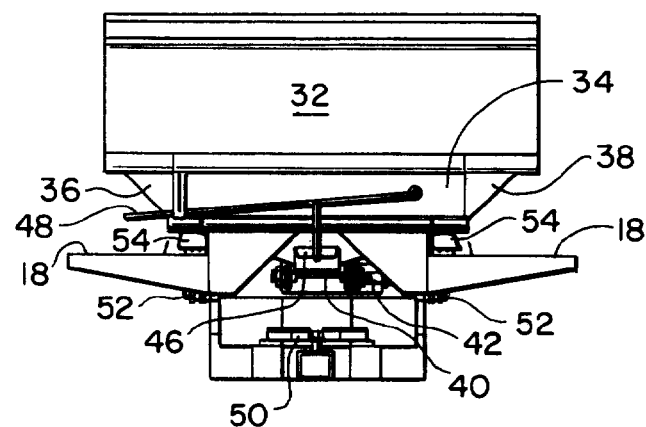
FIG. 5 is a rear view of the vehicle dump unit.
Figure 6:
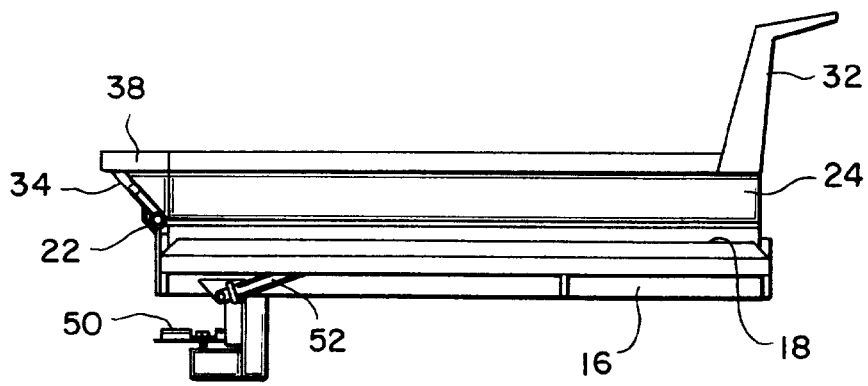
FIG. 6 is a side elevational view of the vehicle dump unit.

Referring first to FIG. 1, there is shown a multi-purpose vehicle that utilizes the principles of the invention. The vehicle includes ground engaging wheels 10 that support a chassis 12 above the ground and an operator or driver's compartment 14. Obviously, there are commercially available numerous basic vehicle chassis suitable for the purposes of the invention.

Figure 7:
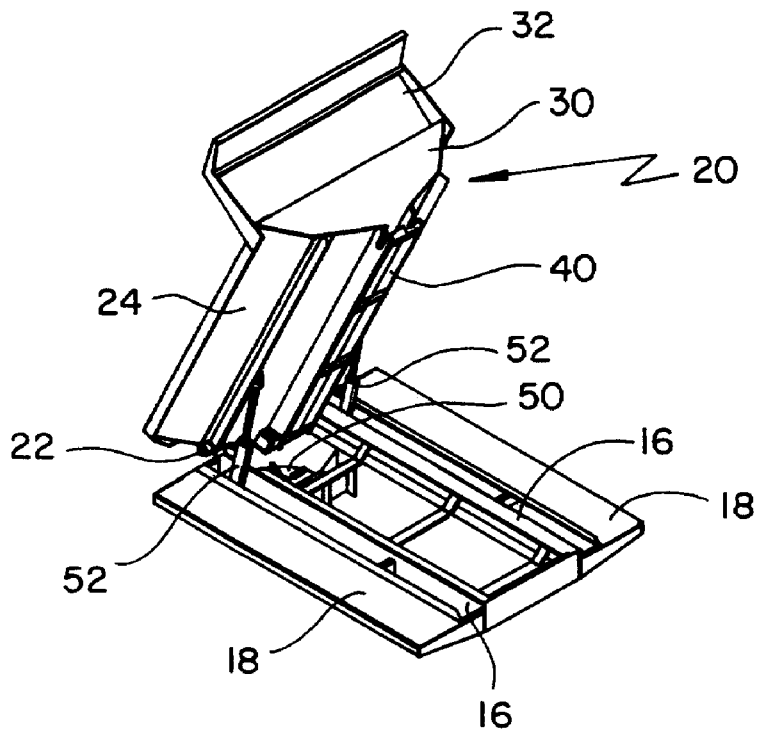
FIG. 7 is a perspective view of the vehicle dump unit showing the unit hoisted into a dumping position.
Figure 8:
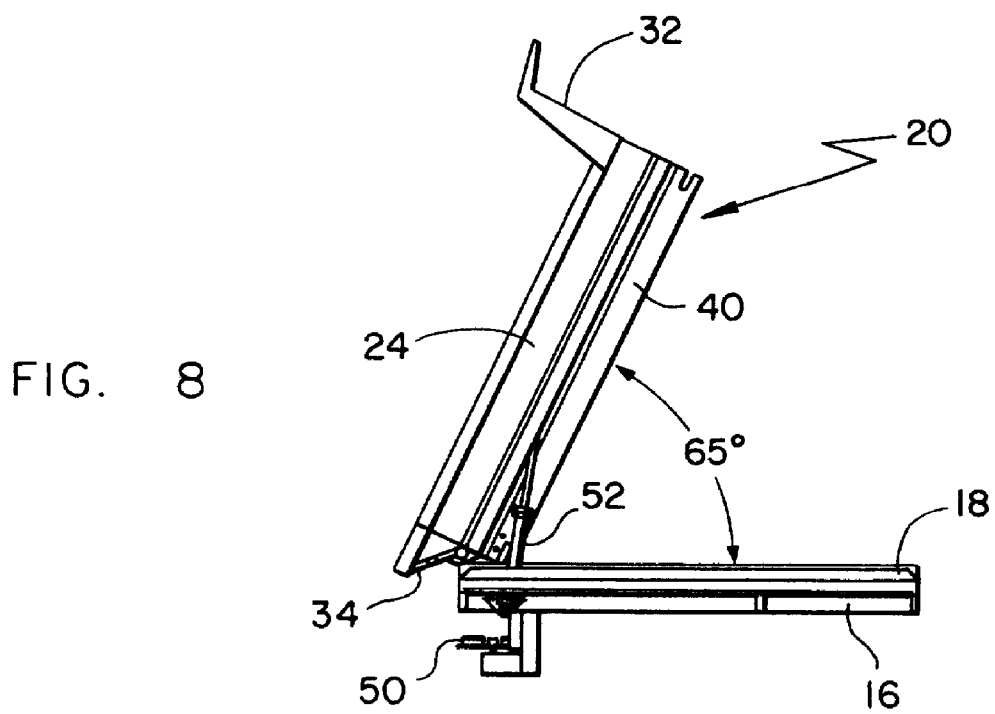
FIG. 8 is a side elevational view showing the unit elevated to the position shown in FIG. 7.

FIGS. 2 through 6, as well as FIGS. 7 and 8, show the primary details of the multi-purpose dump unit, indicated generally by the reference numeral 15, that is mounted on the chassis 12. The unit 15 includes a pair of longitudinally extending frame members 16 which are provided for mounting of the unit 15 to the chassis 12 in any suitable manner, such as by bolts or welding. The frames 16 support outwardly extending fenders 18 and a dump body indicated generally by the reference numeral 20. The body 20 is mounted at its lower rear end on a shaft 22 that is in turn mounted at the rear of frame members 16, thus providing for pivotal movement of the dump body 20.

The dump body 20 has inwardly sloped upper sides 24 and inwardly sloped lower sides 26 that terminate in a longitudinally extending opening 28 at the bottom of the dump body 20. The upper sides 24 are at a steeper vertical angle than the lower sides 26. The dump body 20 has a front wall 30 that extends substantially vertically and a shield 32 that extends upwardly and forwardly from the front wall 30 to protect the operator's compartment 14. The rear wall of the dump body 20 is a fixed rear endgate 34 that slopes inwardly at an angle in the range of about 45° to 75° from the vertical. Rear endgate 34 is fixed to the side walls 24 and 26 with corner pieces 36 and 38 being secured between the outer ends of the rear endgate 34 and the upper side walls 24.

Mounted beneath the opening 28 in the bottom of the dump body 20 is a conveyor 40. Conveyor 40 is of any suitable type that will move material from the front of the dump body 20 to the rear endgate 34. Typically, conveyor 40 is an endless conveyor mounted on shafts at each end with a hydraulic motor 42 powering the shaft 44 at the rear end of the conveyor 40. At the discharge end of the conveyor 40 the rear endgate 34 is provided with a moveable gate 46 that is manually operated through lever 48. Gate 46 is opened when it is desired to discharge material, such as salt, sand or aggregate, from the dump body 20 from where it can be spread by a spreading mechanism indicated generally by the reference numeral 50, that is attached to the frame members 16 at the rear of the dump unit 15. The spreading mechanism 50 is not shown in great detail in the drawings since such mechanisms are well known to those skilled in the art. Typically, such a mechanism includes a rotating disc, equipped with blades, driven hydraulically so as to throw material being discharged through gate 46 outwardly and rearwardly from the vehicle.

In order to lift the dump body 20 when it is desired to dump the contents of the dump body 20 over the rear endgate 34, any suitable lifting mechanism may be provided.

A suitable lifting mechanism is illustrated and includes a pair of hydraulic cylinders 52 secured to the frame members 16 with the operating rods of the members being pivotally connected to longitudinally extending strengthening members 54 that extend along the bottom of the dump body 20 at approximately the juncture of the upper side walls 24 and lower side walls 26. When actuated, the hydraulic cylinders 52 will raise the dump body 20 to a relatively high angle in the range of 55° to 75° with approximately 65° from the horizontal being the preferred angle. As best seen in FIG. 8, at this angle, the sloping rear endgate 34 will slope downwardly allowing the contents of the dump body 20 to be discharged over the top edge of the rear endgate 34.

As previously indicated, the unit of the invention is designed for multiple purposes, including hauling and dumping, spreading and refuse collection as well as carrying, conveying and distributing salt, sand and other aggregates. The unit thus is suitable for spreading of fertilizer or any granular material as well as spreading asphalt and other similar materials. In one version, the unit 15 of the invention is such that it is mounted close to the top of the ground engaging wheels 10, and the top edges of the upper side walls 24 and rear endgate 34 are at a sufficiently low height to meet all requirements for manual dumping of refuse into the dump body 20. With the high angle of lift of the dump unit 15 combined with the angle of the rear endgate 34 of the dump body 20, a vehicle utilizing the principles of the invention can be backed up to any typical refuse collection vehicle and discharge the contents from the dump body 20 into the collection vehicle. When the unit of the invention is utilized for spreading salt, sand or other aggregate mixtures and spreading them, the dump body 20 is not necessarily elevated since the conveyor 40 will convey the material to the rear of the dump body 20 where it can be discharged through the gate 46 onto the spreading mechanism 50. Dimensionally, the unit 15 can also be built sufficiently narrow to enable the vehicle to navigate the narrowest of alleys and streets in the inner cities of metropolitan areas.

It will be evident from the foregoing description that we have designed a vehicle that can be used for multiple purposes including the performance of functions commonly performed by governmental units. In one version, the unit can be designed for manual collection of refuse in the narrowest of alleys and streets and easily unloaded into a typical collection vehicle by simply elevating the dump body. Of particular importance is that the fixed rear endgate is at a sufficient height to dump directly into a typical collection vehicle with the dump unit fully elevated. Most importantly, the unit can be quickly converted from one use to another, including use in the spreading of salt, sand or other aggregates. In most instances, the spreading mechanism can remain mounted on the unit, but if it is desired for whatever reason to remove it, it can be quickly removed and mounted in a matter of minutes. In most instances, nothing is required to convert the unit from one use to another.

Having thus described the invention in connection with the preferred embodiments thereof, it will be evident to those skilled in the art that various revisions can be made to the preferred embodiments described herein without departing from the spirit and scope of the invention. It is our intention, however, that all such revisions and modifications that are evident to those skilled in the art will be included within the scope of the following claims.

What is claimed is as follows:

1. A multiple purpose, tiltable dump unit for mounting on a vehicle truck chassis for general hauling, dumping, spreading, refuse collection, and the distribution of bulk materials, said dump unit comprising:

a dump body having a front end and a rear end with a bottom wall extending therebetween, a front wall extending upwardly from the bottom wall at the front end of the dump body, a fixed end wall joined to the bottom wall and extending upwardly and outwardly from the rear end of the dump body, and side walls joined to the bottom wall and extending upwardly and outwardly from the bottom wall between the front wall and end wall;

the bottom wall having an opening extending generally from the front wall to the end wall an endless conveyor extending longitudinally beneath the opening in the bottom wall to move material in the dump body from the front end to the rear end;

an exit gate combined with the end wall and moveable from a closed position to an open position to provide for discharge of material moved by the conveyor from the dump body;

mounting means for pivotally mounting the dump body on a pivot near its rear end on the truck chassis so as to provide for tilting movement of the dump body from a normally lowered position to an elevated position;

power means adapted to raise the front end of the dump body about the pivot of the mounting means to an angle sufficiently high to dump material over the fixed end wall; and a spreader mechanism positioned beneath the exit gate to receive material discharged through the exit gate and distribute the material.

2. The dump unit of claim 1 in which the side walls of the dump body are of a height sufficiently low for manual refuse loading.

3. The dump unit of claim 1 in which the endless conveyor is operable with the dump body in either the lowered position or the elevated position.

4. A multiple purpose, tiltable dump unit for mounting on a vehicle truck chassis for general hauling, dumping, spreading, refuse collection, and the distribution of bulk materials, said dump unit comprising:

a dump body having a front end and a rear end with a bottom wall extending therebetween, a front wall extending upwardly from the bottom wall at the front end of the dump body, a fixed end wall joined to the bottom wall and extending upwardly and outwardly from the rear end of the dump body, and side walls joined to the bottom wall and extending upwardly and outwardly from the bottom wall between the front wall and end wall;

the bottom wall having an opening extending generally from the front wall to the end wall;

an endless conveyor extending longitudinally beneath the opening in the bottom wall to move material in the dump body from the front end to the rear end;

an exit gate combined with the end wall and moveable from a closed position to an open position to provide for discharge of material from the dump body;

mounting means for pivotally mounting the dump body on a pivot near its rear end on the truck chassis so as to provide for tilting movement of the dump body from a normally lowered position to an elevated position;

power means adapted to raise the front end of the dump body about the pivot of the mounting means to an angle up to about 65° that is sufficiently high to dump material over the fixed end wall; and a spreader mechanism positioned beneath the exit gate to receive material discharged through the exit gate and distribute the material.

5. The dump unit of claim 4 in which the power means includes hydraulic hoists.

6. The dump unit of claim 4 in which the end wall extends upwardly and outwardly at an angle to the vertical of about 45° to about 75°.

7. The dump unit of claim 6 in which the side walls of the dump body are of a height sufficiently low for manual refuse loading.

* * * * *